Nov. 11, 1952  E. L. VERHAGEN  2,617,952
ELECTRIC MOTOR BRUSH HOLDER CONNECTION
AND METHOD FOR MAKING SAME
Filed Nov. 6, 1950
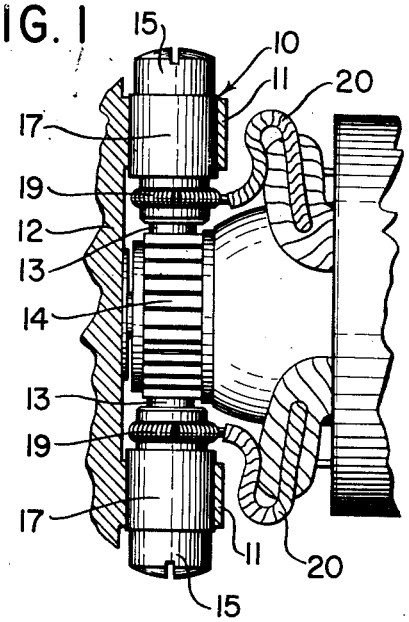
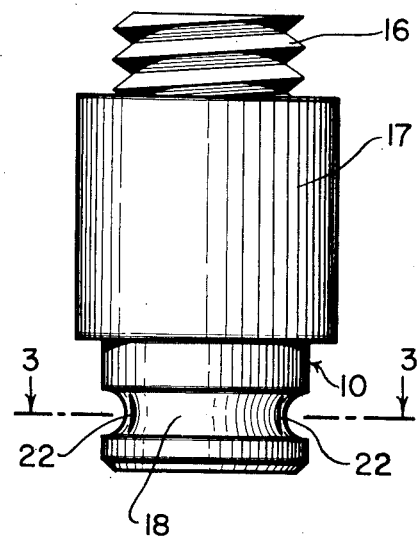
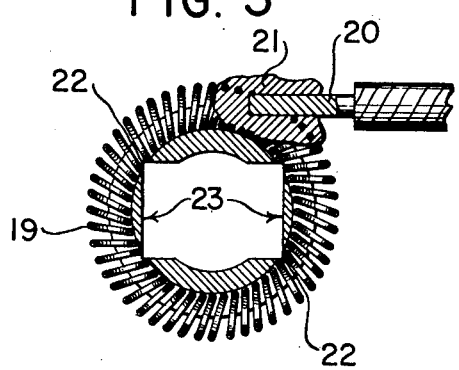
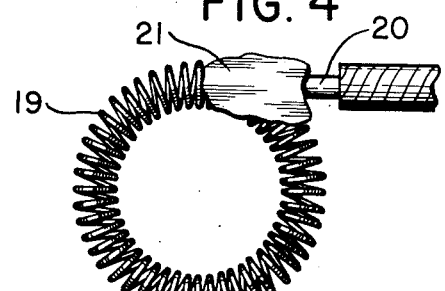
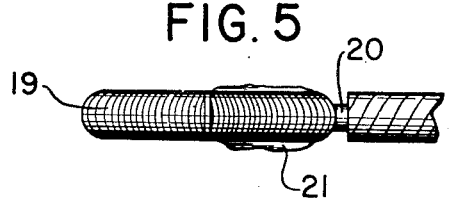
INVENTOR.
Edward L. Verhagen
BY
Attorney Patented Nov. 11, 1952

2,617,952

UNITED STATES PATENT OFFICE 2,617,952

ELECTRIC MOTOR BRUSH HOLDER CONNECTION AND METHOD FOR MAKING SAME

Edward L. Verhagen, Rahway, N. J., assignor to The Regina Corporation, Rahway, N. J., a corporation of New York Application November 6, 1950, Serial No. 194,330

2 Claims. (Cl. 310—247)

1

The present invention relates to an electrical connection and more particularly to an electrical connection for brushes of small electric motors.

The object is to provide a novel, simple, inexpensive and reliable electric motor brush holder connection and a method for making the same.

It has been customary in the past to connect the electrical lead to the brush holders by placing a small groove on the outside of the brush holder and securing a lead thereto by use of a small helical spring. The spring is bent and secured in the form of a circle and slipped into the groove of the brush holder.

The natural vibration of the motor while running has a tendency to cause the spring and its electrical lead to rotate on the brush holder. This rotation causes displacement of the lead, and there is a dangerous tendency for the point of connection between the spring and the lead to touch the motor housing causing a short-circuit.

Motor brush lead connectors of the type here under consideration are used primarily on small electrical motors of the fractional horsepower type. Such motors are used in sewing machines, vacuum cleaners, floor polishers, and a great number of other small electrically operated devices. Weight and size are prime considerations in the design of electric motors of this type and every effort is made to keep these two features of the motor at a minimum. For this reason the housing is constructed as close as possible to the motor itself. This results in the housing end wall being extremely close to the brush holders.

In motors of this type, rotation of the spring and brush leads on the brush holder has lead to short circuits from two principal sources. First of all when the spring has rotated approximately 180° the point of connection between the spring and wire lead is very likely to come into contact with the end wall of the housing causing a short circuit. Another result of the rotation of the spring on the brush holder is the displacement of the wire lead. There is a great danger that this lead will come into contact with the commutator. As the commutator rotates at a high speed it wears the insulation off of the wire lead, again causing a short circuit.

One attempt to eliminate this dangerous situation has been to solder the spring to the brush holder. This obviously adds another step in the assembly of the motor and increases the cost of production. By using a brush holder embodying the applicant's invention the rotation of spring on the brush holder is eliminated without the

2 addition of any additional steps in the assembly of the motor. A brush holder can be constructed embodying the applicant's invention with, for all practical purposes, no attendant additional cost of manufacture. It can therefore be seen, that a motor that is much safer in operation can be produced at no additional cost of manufacture.

These and other objects and advantages of the present invention will be more readily apparent from the following description and drawing of one specific embodiment of the invention, in which drawing:

Fig. 1 is a side view of one end of an electric motor having brush holders embodying the present invention, in which figure a portion of the housing has been broken away;

Fig. 2 is a side view of a brush holder embodying the present invention;

Figure 3 is a sectional view taken along line 3—3 on Fig. 2 with the spring and lead wire in position on the brush holder;

Fig. 4 is a plan view of the spring and lead; and

Fig. 5 is a front view thereof.

The brush holders 10 are secured to rings 11 which are formed integral with the end wall 12 of the motor housing. The carbon brushes 13 are held within the brush holder in close contact with the commutator 14. It is customary to provide compression springs within the brush holder 10 to urge the brushes 13 into close contact with the commutator 14. Such compression springs (not shown) are positioned between the nut 15 and the carbon brushes 13. The nut 15 is threaded into the tapped end 15 of the brush holder 10.

A ring of insulating material 17 is secured to the brush holder on the outer surface thereof, and when the brush holder is secured in the ring 11 of the end wall 12, the insulator 17 provides a complete electrical insulation between the end wall 12 and the brush holder 10.

As can best be seen in Fig. 2 the brush holder 10 is provided at one end with groove 18 into which the helical spring 19 fits. The spring 19 forms an electrical connection between brushes holder 10 and the primary winding leads 20, and also acts to secure the leads 20 to the brush holder 10. The brush holder 10 is in close electrical contact with the brushes 13 and therefore the leads 20 are also electrically connected to the brushes 13. The spring 19 is bent into a loop to form a resilient collar and is secured in this position by solder 21. The solder 21 also secures the primary winding lead 20 to the spring 19.

Projections 22 are located in groove 18, four of such projections 22 are shown. Of course more or less than that number may be used. The projections 22 within groove 18 form gripping points for the spring 19, and act to prevent the spring 19 from rotating within the groove. The vibration of the motor as it operates tends to cause the spring 19 to rotate about the longitudinal axis of the brush holder 10. It can readily be seen that if the spring 19 rotated far enough so that the soldered connection point were located to the left in Figs. 1 or 3, there would be a great danger that this point would touch the end wall 12 of the casing causing a short-circuit. It is also apparent that there is a danger that the primary winding lead 20 might brush against the commutator with the result that its insulation would be worn off causing a short circuit. It can therefore be seen that the projections 22, by providing gripping points for the spring 16, prevent its rotation, and eliminate this source of dangerous short circuits.

As can be best seen in Fig. 3 the brush holders 10 are hollow and the rectangular brushes 13 are held within this hollow opening. The hollow opening is provided with two rectangular portions 23 which extend the length of the brush holder 10. In the manufacture of the brush holder these rectangular portions 23 are formed by broaching. The broaching operation at the point directly under the grooves causes the thin wall of material at the corners of the rectangular portion to be displaced rather than being cut away; as can be readily appreciated, the wall of the brush holder at this point becomes extremely thin during the broaching operation, and therefore is easily displaced. In the specific form of the invention shown in the drawing, the material so displaced becomes the projections 22.

I claim:

1. A brush holder connection for an electric motor which comprises a cylinder of conductive material having a circumferential groove near one end and having a perforation of polygonal cross section extending from end to end, the material of said cylinder being flared outwardly adjacent the corners of said perforation into said groove, and a garter spring partly within said groove and surrounding said cylinder.

2. The method of making a brush holder connection for an electric motor which comprises forming a circumferential groove near one end of a cylinder of conductive material having an axial bore therethrough, forcing a broach of polygonal cross section through said bore and thereby radially deforming the material of said cylinder within said groove, and surrounding said cylinder at said groove with a garter spring.

EDWARD L. VERHAGEN.

REFERENCES CITED

The following references are of record in the file of this patent:

UNITED STATES PATENTS

| Number | Name | Date |
|---|---|---|
| 1,793,258 | Smellie | Feb. 17, 1931 |
| 2,449,764 | Bluemink | Sept. 21, 1948 |
| 2,454,230 | Stickney | Nov. 16, 1948 |